United States Patent

Biazzo et al.

[15] 3,678,574

[45] July 25, 1972

[54] ACOUSTICALLY ABSORBENT MOUNTING METHOD FOR OPTICAL MODULATOR

[72] Inventors: Martin Robert Biazzo, Holmdel; Bernard George King, Rumson, both of N.J.; William Charles Gormley Ortel, New York, N.Y.

[73] Assignee: Bell Telephone Laboratories, Incorporated, Murray Hill, N.J.

[22] Filed: Nov. 9, 1970

[21] Appl. No.: 87,850

Related U.S. Application Data

[62] Division of Ser. No. 780,347, Dec. 2, 1968, Pat. No. 3,614,201.

[52] U.S. Cl. ..................................29/592, 29/25.35, 29/502

[51] Int. Cl. ..........................................................H01s 4/00

[58] Field of Search .................29/592, 29.35, 591, 589, 590, 29/502; 350/160

[56] References Cited

UNITED STATES PATENTS 3,454,325 7/1969 Ohm ......................................310/160

*Primary Examiner*—John F. Campbell

*Assistant Examiner*—D. M. Heist

*Attorney*—R. J. Guenther and Kenneth B. Hamlin

[57] ABSTRACT

Acoustical ringing which results from piezoelectric effects in an electro-optical modulator is suppressed by mounting the modulator crystal between massive, acoustically absorbent, support members which also provide an electric circuit interface for applying electric signals to the modulator. Solder provides such an absorbent mounting for a lithium tantalate electro-optical modulator crystal. Both solder support members are applied during the same heating interval and permitted to cool simultaneously. In one embodiment the solder application is accomplished in a first step wherein mounds of solder are applied adjacent to the crystal at a first temperature and in a second step wherein additional solder is applied at a lower temperature between the crystal and the solder mounds.

7 Claims, 4 Drawing Figures

INVENTORS M. R. BIAZZO
B. G. KING
W. C. G. ORTEL
BY
Charles Scott Phelan
ATTORNEY

ACOUSTICALLY ABSORBENT MOUNTING METHOD FOR OPTICAL MODULATOR

CROSS REFERENCE TO RELATED APPLICATION

This application is a division of our copending application, Ser. No. 780,347, now U.S. Pat. No. 3,614,201 filed Dec. 2, 1968.

BACKGROUND OF THE INVENTION

1. Field of the Invention

This invention relates to mounting arrangements for optical modulator crystals, and it involves in particular a mounting method for reducing mechanical vibrations produced in the modulator.

2. Description of the Prior Art

Ferroelectric modulators for electromagnetic radiation, e.g., radiation in the visible light range, respond optically to the desired electric field but also produce by piezoelectric action mechanical vibrations which are not desired. One example of such a modulator is an elongated crystal of lithium tantalate. A finite time interval is required after an applied voltage change for the vibrations to die out; and they have, therefore, come to be called "acoustical ringing." "Acoustical" is used here to distinguish, for example, electrical ringing and has reference to mechanical vibrations at any frequency, but typically at high frequencies such as 10 megahertz and well above the audible range. The vibrations can interfere with the desired signal modulation that is normally effected by rotation of polarization orientation for the radiation which is transmitted through the modulator. Undesirable piezoelectric effects are present at all frequencies at which the modulator is operated; but, as the modulating signal frequency increases, the ringing skirts which are added to the information bits begin to overlap adjacent bit intervals thereby causing intersymbol interference.

Previous efforts toward reducing the effects of the aforementioned acoustical ringing have taken a number of different forms. In each case there have remained significant frequency limitations which prevented useful operation in the gigahertz frequency range that is necessary for efficient utilization of the bandwidth of the electromagnetic radiation in the light band. For example, attempts have been made to suppress the ringing by providing supplementary signals to cancel out the ringing effects. In another arrangement, a mechanical structure was provided to shift the frequency of mechanical vibrations in the modulator crystal to a frequency range which could be conveniently damped out by immersing the crystal in oil. Arrangements such as those heretofore found in prior art are complex and expensive, as well as in some cases requiring structures with such high capacitance that they cannot be usefully employed in the gigahertz frequency range. A measure of damping achieved by soldering a modulator crystal to the large mass of a copper heat sink has also been utilized in the prior art, but its operation was found to be unsatisfactory for ordinary modulation in the gigahertz frequency range.

It is now known, as disclosed and claimed in our aforementioned related application, that large masses of solder engaging a modulator crystal to provide both support and electrical connection also provide excellent damping of the acoustical ringing effects. However, the application of such solder masses can endanger the electrical integrity of the modulator crystal, which is an extremely expensive element of a modulator system. The latter hazard results from the fact that metallic contact films are usually applied to modulator crystals to facilitate electrical connection thereto. It is well known in the art that films of great thickness do not adhere well to the crystal while thinner films are readily vaporized, thereby destroying the electrical contact function, if soldering heat is applied for a sufficient time. Thus, films which are suitable for making most electric connections tend to be vaporized if heat is applied long enough to apply large masses of solder for connection. Consequently, solder has not heretofore been employed for acoustically absorbent contacting mounts for electro-optical modulators and the operating frequency range of such modulators has been correspondingly limited.

It is, therefore, one object of the present invention to improve electro-optical modulators.

It is another object to suppress acoustical vibration in electro-optical modulators.

A still further object is to attach acoustically absorbent contacting mounts to an electro-optical modulator for operation in the gigahertz frequency range.

SUMMARY OF THE INVENTION

The aforementioned and other objects of the invention are realized in an illustrative embodiment in which a ferroelectric, electro-optical modulator crystal is mounted between positioning members which restrain its mechanical movement and also provide electrical connection to the modulator. The interfaces for electrical and mechanical coupling between the crystal and each of those support members are similar and essentially uniform. The support members are formed and their electrical and mechanical engagement with the modulator crystal is accomplished essentially simultaneously for the two support members so that the electrical interface is free of coupling imperfections that could permit localized sustained vibrations in the crystal.

It is one feature of the invention that the support members thus formed for the modulator crystal have a mass which is much larger than the crystal mass.

Another feature is that the support members are highly absorbent for acoustical vibrations.

It is another feature that the electrical interface between the support members and the modulator crystal is extended across substantially the full area of the two faces of the crystal between which electric signals are applied.

A still further feature is that the modulator support members are formed of solder applied along the modulator under the same heat conditions and under microscopic monitoring of the formation of the support members for detecting and eliminating interfacial imperfections. In one embodiment the solder is applied in a two-step operation at different temperatures to avoid vaporization of contact films usually applied to modulator crystals prior to application of solder.

BRIEF DESCRIPTION OF THE DRAWING

A more complete understanding of the invention and its various features, objects, and advantages may be obtained from a consideration of the following detailed description in connection with the appended claims and the attached drawing in which:

DETAILED DESCRIPTION

Figure 1:
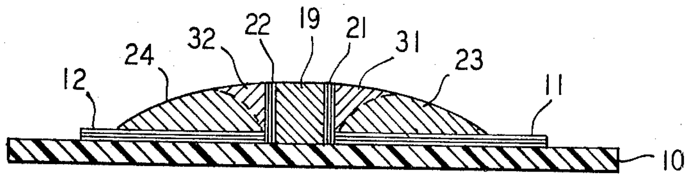
FIG. 1 is a sectional view in elevation of a modulator mounting arrangement in accordance with one aspect of the invention.

In FIG. 1 a glass substrate 10 has thin film metallic contact areas 11 and 12 deposited thereon. Although an object is to suppress acoustical vibrations and glass is an acoustically live material, modulator positioning means that are acoustically dead will be described for use in conjunction with the glass to combine the advantages of a high acoustical damping constant and thin film circuit technology. The mentioned contact areas and other elements in FIG. 1 are shown in exaggerated proportion in order that their arrangement with respect to one another may more readily be appreciated. Each of the contact areas 11 and 12 is made up of several laminations. A conventional thin film circuitry substrate of glass with a layer of tantalum oxide covered in succession by tantalum oxide, tantalum nitride, nichrome and gold layers is photoetched to obtain gold contact areas in the desired pattern and interconnecting tantalum nitride resistors as needed for the resulting circuits. A copper film is then electroplated onto the gold contact areas and tinned. The resulting contact area pattern for the illustrated embodiment is shown in the partial top view of FIG. 2. A solder with a melting point of 95° C is advantageously employed for the tinning and includes by weight, 16 percent tin, 32 percent lead, and 52 percent bismuth.

Figure 2:
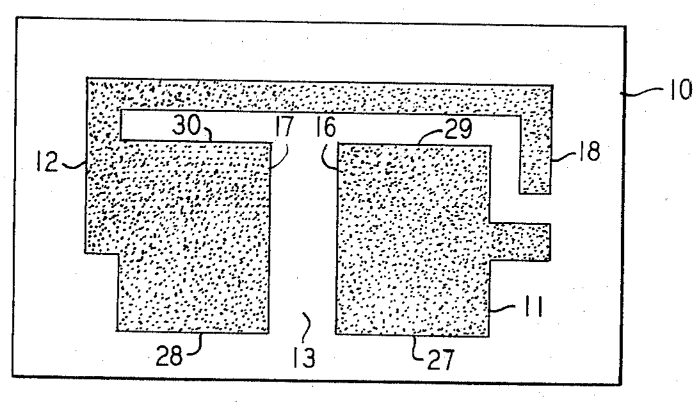
FIG. 2 is a partial top view of the structure in FIG. 1 with some of the elements removed.

A space 13 is left clear of gold and tantalum nitride between the edges 16 and 17, and all around contact areas 11 and 12, of the contact areas 11 and 12, respectively, so that there is no electrical connection therebetween as shown in FIG. 2. The space between edges 16 and 17 is equal to the width of a modulator crystal 19 with its contacts 21 and 22, and the modulator crystal will be subsequently placed in that space as hereinafter described. A part of the contact area 12 extends around the top of the substrate 10 as shown in FIG. 2 to provide a contact portion 18, which is close to the contact area 11, for facilitating electrical connection to both contact areas 11 and 12 while at the same time permitting a semiconductor driver to be connected electrically in parallel with the modulator as described in the copending application Ser. No. 780,346, filed Dec. 2, 1968, of B. G. King and R. P. Reisz entitled "Gunn Effect Driver for Optical Modulators" and assigned to the same assignee as the present application.

A structure which is both acoustically absorbent and massive, by comparison to the mass of electro-optical modulator crystal 19, is utilized to provide electrical connection between the aforementioned contact areas and the side of the crystal. Such structure also provides firm support for the crystal to position it in its appointed location in the space 13 between contact areas 11 and 12. Solder was selected for the massive absorbent support and connecting structure because it is electrically conductive and because it has an acoustical impedance which is essentially compatible with the acoustical impedances of modulator crystals such as lithium tantalate and has a high acoustical loss, i.e., a high acoustical damping constant. The acoustical impedance match for solder is not perfect, but it is among the better electrical conductor materials which showed satisfactory impedance compatibility and absorption. Furthermore, solder is inexpensive, easily worked, and commercially available in different alloys with different melting points and different acoustic impedances. All of these characteristics yield improved performance over prior art arrangements and facilitate construction as will hereinafter be described. Electro-optical modulators such as lithium tantalate have modulation characteristics that are to some extent thermally sensitive. The structure herein described operates satisfactorily for some applications with the solder providing adequate heat sink function. In other applications additional thermal control apparatus, e.g., an oven control or a supplemental copper heat sink, may be provided in accordance with well known techniques. Alternatively, the technique of driving two oppositely oriented, as to electric field direction, modulator crystals in optical tandem with an intermediate quarter wave plate can be used to provide temperature compensation.

It is further necessary in order to achieve satisfactory acoustical damping for high-frequency operation that the mechanical interface between the modulator and its support structure extend over substantially the full area of the crystal faces between which the electric field is applied. Electrical contact to the modulator is made through the support structure and utilizes the mechanical interface to advantage for establishing electric field uniformity through the modulator. That interface must be free of any imperfections that could permit the crystal to ring in even a minute localized region. It has been found that a small void at the interface or small foreign matter, such as lint, e.g., an imperfection with a dimension commensurate to the height of the crystal 19 as shown in FIG. 1, will permit objectionable ringing. Such interface criteria are advantageously achieved by applying contact films 21 and 22 to two crystal faces and flowing molten solder into the spaces partially defined by the substrate contact areas 11 and 12 and the modulator contact films 21 and 22. The solder masses so positioned have a roughly triangular, or tapered, cross section as illustrated in FIG. 1. The direction of the taper is away from either side of crystal 19 and perpendicular to the length, i.e., the optical path in the crystal.

The contact films 21 and 22 are formed of laminations. In this case each of the contact films 21 and 22 advantageously comprises laminations of chromium, copper, and gold which are evaporated in that order onto the modulator crystal faces that are perpendicular to the C-axis, i.e., the ferroelectric polar axis, of the crystal. Plural modulator crystals, such as the crystal 19, are preferably formed initially in a large wafer which is then coated by evaporation on both sides with the contact film materials chromium, copper, and gold. The coated wafer is then cut into rods, each of which comprises a modulator crystal such as the modulator 19. Consequently, there is no danger of evaporation overshoot onto the top or bottom surface of the crystal in the orientation shown in FIG. 1. During the coating operation and prior to cutting the wafer into rods, the wafer edges are masked to prevent evaporation overshoot onto the surfaces which constitute the end surfaces of the modulator rods. Such an end surface is parallel to the cross-section face of crystal 19 illustrated in the plane of the drawing of FIG. 1. The result of the masking to achieve the elimination of evaporation overshoot is to leave a small, nonplated, guard zone at each end of the modulator rod. These end zones can be seen in exaggerated proportion in the perspective view of FIG. 3. In an actual structure, the end zones are of much shorter length than the total length of the modulator rod 19 so that there is no significant distortion of the electric field applied to the rod when it is operated as an electro-optical modulator.

In a preferred embodiment of the invention, major masses 23 and 24 of high melting temperature solder are applied to substrate contact areas 11 and 12, respectively, before the modulator rod 19 is placed on the substrate. One solder which is suitable for this purpose has a melting point of about 188° C and comprises by weight approximately 50 percent each of lead and tin. The major masses 23 and 24 of solder are applied before the modulator is assembled so that the bulk of the support structure can be established in position and in electrical contact with the contact areas 11 and 12 thereby correspondingly reducing the amount of time that the substrate and crystal contact areas, and the modulator crystal 19 must be held under high temperature conditions for final assembly.

Solder masses 23 and 24 are applied in molten form by heating the entire substrate assembly by heating means not shown; and melting the solder on contact with the assembly. The extent of the deposits on the contact areas is limited by the edges of the tinned contact areas on two sides. Thus, the edges 27, 28, 29, and 30 limit the extent of solder application at the sides of the contact areas. In the contact area positions, which are close to and remote from the anticipated modulator location, the solder deposited is quantity-limited in that enough solder is applied so that the major masses 23 and 24 advantageously extend to about three-fourths of the height of the modulator 19 as seen in FIG. 1. The latter limiting is achieved by limiting the heating to approximately the solder melting point so that it can be mounded as shown in FIG. 1 without running out over the full extent of contact areas 11 and 12. The resulting solder mound functions as a dam to prevent free running of lower temperature connecting solder masses to be applied later.

In one embodiment in which the modulator 19 had height and width dimensions of approximately 10 mils each for the section shown in FIG. 1, the cross section of the major solder masses 23 and 24 extended out in both directions away from the modulator mounting space 13 about 125 mils. The solder dimensions are not at all critical as long as the total, final solder mass is substantially greater than the mass of the modulator 19. With the dimensions previously noted, and after the addition of low temperature solder, which will be subsequently described, the total solder supporting mass and volume are at least one order of magnitude greater than the mass and volume of modulator 19. Once the major solder masses 23 and 24 are in place, the entire structure is then cooled so that similar interface conditions prevail between each of the solder masses 23 and 24 and their respective contact areas 11 and 12.

Figure 3:
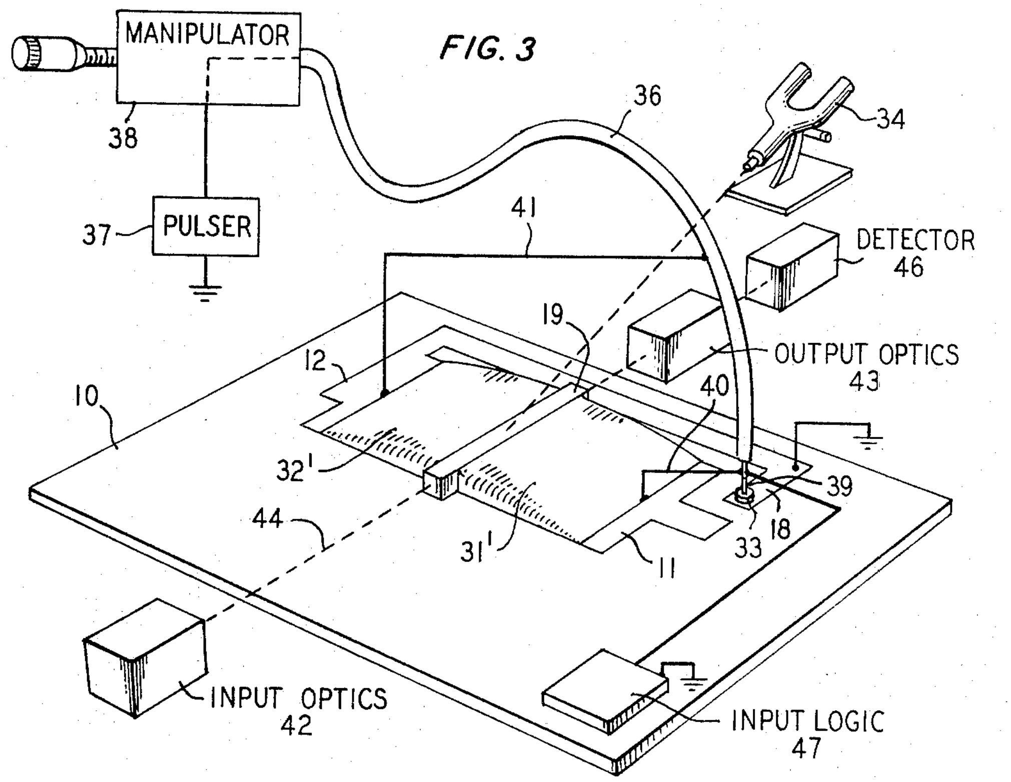
FIG. 3 is a perspective view of the mounting arrangement in FIG. 1 in a simplified optical modulation system.

Modulator 19, with its evaporated contacts 21 and 22, is now placed in the space 13 between contact edges 16 and 17, which are then adjacent to the modulator contacts. In this position the modulator crystal 19 extends somewhat beyond the edges of contact areas 11 and 12, as illustrated in FIG. 3 but only to the extent that crystal 19 is not covered by contacts 21 and 22. Crystal 19 is firmly but temporarily held in this relationship by clamping or spring loading means not shown. When thus held, crystal 19 is in contact with the tantalum oxide on the glass substrate 10 to the extent allowed by the roughness of the respective surfaces. Since glass is acoustically live, it may be useful in some applications to space crystal 19 from substrate 10 as illustrated for example in FIG. 1A. In the latter case the crystal is supported by removable shims, not shown, which are removed after the assembly has been completed, thereby leaving the crystal supported entirely by the solder masses herein described.

Figure 1A:
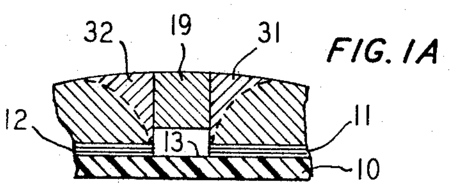
FIG. 1A is a partial sectional view in elevation of a modified form of the embodiment of FIG. 1.

When the crystal is in place in the form shown in either FIG. 1 or FIG. 1A low temperature connecting masses 31 and 32 of solder are run into the spaces between the major solder masses 23 and 24 and the modulator contacts 21 and 22, respectively. This low temperature solder is the same solder previously used for tinning the contact areas 11 and 12 and is applied while the assembly is heated to a temperature above the 95° C. melting point of the solder but less than 188° C. The low temperature solder runs freely at this new temperature. Consequently, the high temperature solder masses 23 and 24 are undisturbed except for interface alloying with the low temperature solder. However, the low temperature solder used for tinning the contact areas 11 and 12 is not remelted at this time because it had previously been absorbed into the solder masses 23 and 24 thereby losing its low temperature melting characteristic.

During all of the soldering operations, and particularly during the application of the connecting low temperature masses 31 and 32, the operations are advantageously microscopically monitored to detect voids or foreign material in the solder or on the contact surfaces, or any other imperfections in the solder masses that might allow localized ringing of the modulator in response to the application of an electric field. For example, an attendant using a microscope 34 in FIG. 3 simultaneously observes the interfaces with the modulator and controls the solder application. It has been already noted that minute imperfections in the solder interface can permit localized vibration in the modulator which is detrimental to high frequency performance. However, no difficulty was experienced in securing such a degree of perfection in the soldering application when it was microscopically monitored, and possible imperfect conditions were readily detected and corrected before the solder cooled, such corrections being effected by directing a flow of air at the physical object or by wiping the solder with a small brush dipped in flux to eliminate any voids. Upon completion of the application of the connecting solder masses 31 and 32, the entire assembly was once more cooled simultaneously and the total structure cleaned. Crystal 19 is, by the described process, firmly bonded to substrate 10 through the solder mounting members.

Solder masses 31 and 32 are relatively small compared to the total solder mass illustrated. Consequently the masses 31 and 32 can be applied with adequate heat and for a sufficient time to secure an appropriate bond without significant risk that the contact areas 21 and 22 will be vaporized and thereby render the contact structure ineffective. Electrical contacts to piezoelectric materials have been made for many years, but the problem of contact film vaporization was not too serious because the acoustical ringing activity was not a problem in the finished product, and the disparity between piezoelectric member volume and total contact structure volume was absent so the danger of contact film vaporization was not serious. Thicker contact films could reduce the vaporization problem, but thick films have been found to display a tendency to separate from the crystal too readily, and thick films greatly increase the difficulty of cutting a film-coated slab into bars sufficiently small for convenient use as the modulator 19.

In FIG. 3 a semiconductor driver such as a gallium arsenide crystal 33, which is suitable for operation as a Gunn effect oscillator, is applied to the contact area portion 18 for supplying high frequency drive pulses to modulator 19 to test the quality of the assembly and for subsequent modulator operation. Such operation is set forth in detail in the aforementioned King et al. application. A rigid, shaped, coaxial line 36 connects the electrical output of a pulser 37 to the crystal 33. A micromanipulator 38 is provided for positioning the coaxial line 36 so that its center conductor 39 is placed in a pressure contact relationship with the crystal 33. That same conductor 39 is connected to the contact area 11 at the edge of the solder mass 31′ by a lead 40 while the outer conductor of the coaxial line 36 is connected by a lead 41 to the contact area 12 at the edge of the solder mass 32′. Thus, the crystal 33 and the modulator 19 are connected in parallel in a drive circuit across the output of pulser 37.

The low frequency output of the pulser 37 drives the crystal 33 into its Gunn operation mode for coupling the resulting high frequency pulses to the modulator 19. The output of pulser 37 is used in this embodiment to avoid adverse thermal effects of prolonged bias on the crystal 33. A light beam 44 is provided by input optics 42 for transmission through the modulator 19 and output optics 43 to a suitable detector 46. Input logic 47 supplies binary coded information signals for controlling the operation of crystal 33 in its Gunn effect mode, and correspondingly effecting modulation in crystal 19, as described in the King et al. application. The logic 47 is advantageously included on the substrate in this embodiment.

In one embodiment of the invention which was constructed as outlined herein, a modulator crystal 19 which operated satisfactorily was a lithium tantalate crystal which was 0.5 inch in length and 0.010 inch in width and in height. This modulator was successfully operated at a 2 gigahertz bit rate to produce approximately 20 percent modulation that was readily detectable by the detector 46.

Although the present invention has been described in connection with a particular embodiment thereof, it is to be understood that additional embodiments and modifications which will be obvious to those skilled in the art are included within the spirit and scope of the invention.

What is claimed is:

1. A method for applying electrical connections to predetermined faces of a member and comprising the steps of
heating the member to a predetermined temperature,
applying electrically conductive material of high acoustical damping constant into contact with said faces of said member to cover substantially the full extent of said faces, at least a portion of said material having a melting point such that the material can be shaped at said temperature,
shaping said material into a mounded configuration having a roughly triangular cross section, and cooling the material at said faces simultaneously.

2. The method in accordance with claim 1 in which
the member has films of conductive material adhering to said faces, and
in the step of applying damping conductive material, the time of said heating when said damping material is applied into actual contact with said member, through said films, is limited to a time interval sufficient to apply said damping material without losing modulation-controlling electrical continuity from the damping material through said films to said member.

3. A method for mounting an electro-optical modulator member to reduce at least selected piezoelectric effects upon the modulation function of the member, said method comprising the steps of mounting contacts in spaced relation on a horizontal substrate, positioning the member on the substrate between the contacts, heating the member, contacts, and substrate to a predetermined temperature, flowing solder with a melting point below said temperature into connecting relationship between the member and the contacts, detecting and removing manually interfacial imperfections between said member and said solder in said relationship, and cooling the solder at both sides of the member simultaneously.

4. The method for applying electrical connections to predetermined faces of an electro-optical modulator member, said method comprising the steps of heating to a first predetermined temperature a substrate having a pair of contact areas thereon spaced to accommodate said member, applying a first solder material to said contact areas, said solder material having a melting temperature such that it can be mounded but does not flow freely at said first temperature, cooling said substrate, contact areas, and solder to a second temperature at which said solder material is solid, positioning said member between said contact areas, applying a second solder material to said contact areas between said member and said first solder material to fill spaces between said first solder material and said member, said second solder material having a melting temperature below said second temperature so that it flows freely at said second temperature, and cooling said member, substrate, contact areas, and solder materials to a temperature at which said second solder material is solid for bonding said member to said contact areas through said solder materials.

5. The method in accordance with claim 4 in which the predetermined faces of the member are on opposite sides thereof and such faces have films of conductive material adhering thereto, said step of applying said first solder material includes the substep of mounding such solder material to form a dam to retain the subsequently applied second solder material adjacent to said films and to form a total solder material volume which is much greater than the volume of said member and substantially equally disposed adjacent said faces, tapering down in thickness away from such faces, and the step of applying the second solder material includes the substep of microscopically observing the application to detect and remove interfacial imperfections between said films on each of said faces and said second solder material to provide a substantially homogeneous interface across said faces, said second temperature is maintained for a time interval sufficient to apply said second solder material without losing modulation-controlling electrical continuity from the solder material through said films into said member.

6. A method for mounting an electro-optical modulator member on a substrate to reduce at least selected piezoelectric effects upon the modulation function of the member, said method comprising the steps of applying electrical contact films to predetermined opposite faces of a wafer of piezoelectric electro-optical material, applying electric contact films to predetermined spaced areas on a surface of said substrate member, cutting at least one of said electro-optical modulator members from said wafer to form a rod-like modulator member having electrical contact films on two opposite faces thereof and extending longitudinally along such member, heating the member to a predetermined temperature, applying electrically conductive material of high acoustical damping constant into contact with said faces of said member to cover substantially the full extent of said faces, at least a portion of said material having a melting point such that the material can be shaped at said temperature, shaping said material into a mounded configuration having a roughly triangular cross section, and cooling the material at said faces simultaneously.

7. The method in accordance with claim 1 in which the member has films of conductive material adhering to said faces, and in the step of applying damping conductive material, the time of said heating when said damping material is applied into actual contact with said member, through said films, is limited to a time interval of suitable duration to avoid vaporization of said films.

* * * * *